June 4, 1940.  W. ASTLE  2,203,123
GASKETED PLATE
Filed Aug. 16, 1938   2 Sheets-Sheet 1
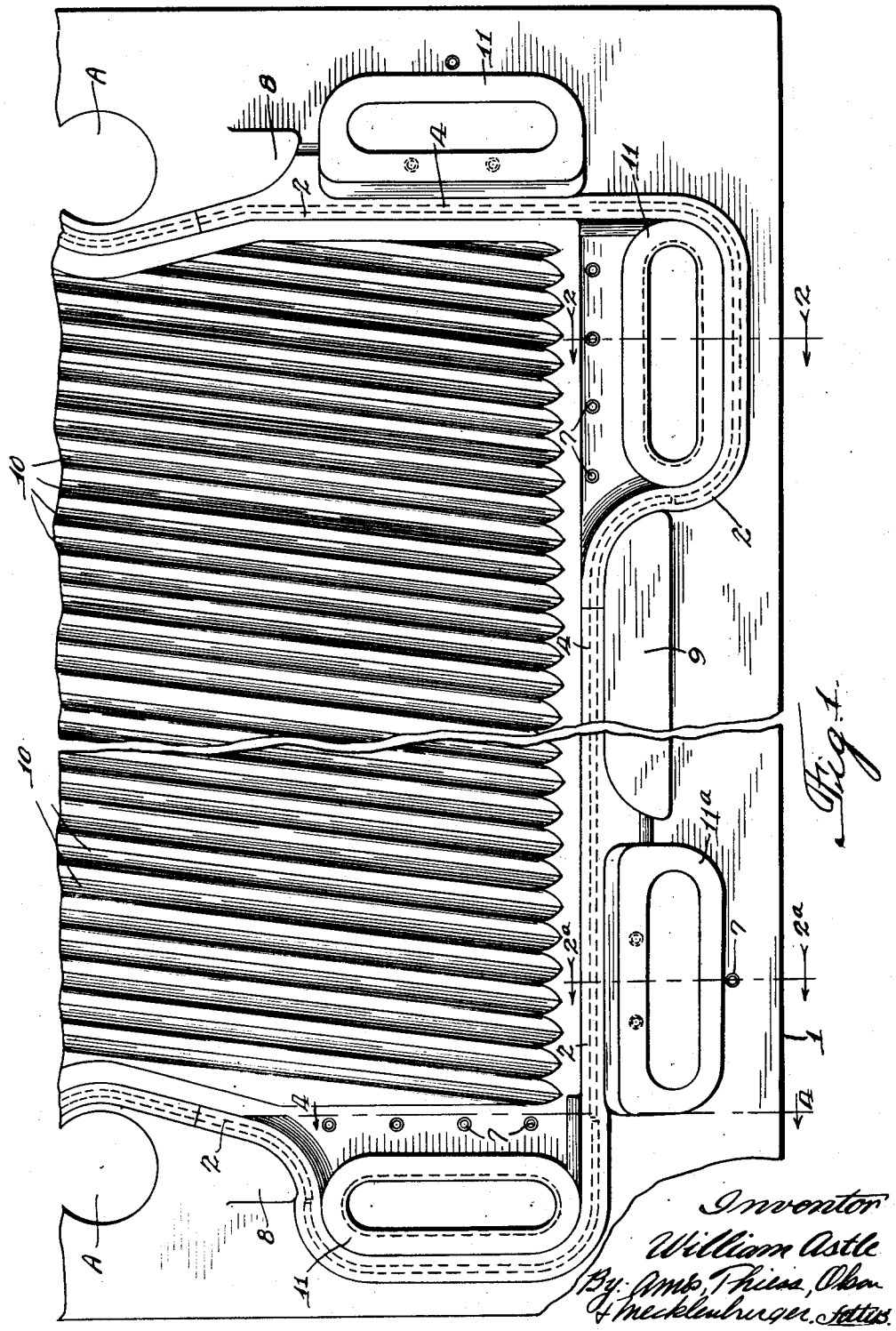

June 4, 1940.　　　　W. ASTLE　　　　2,203,123
GASKETED PLATE
Filed Aug. 16, 1938　　　2 Sheets-Sheet 2
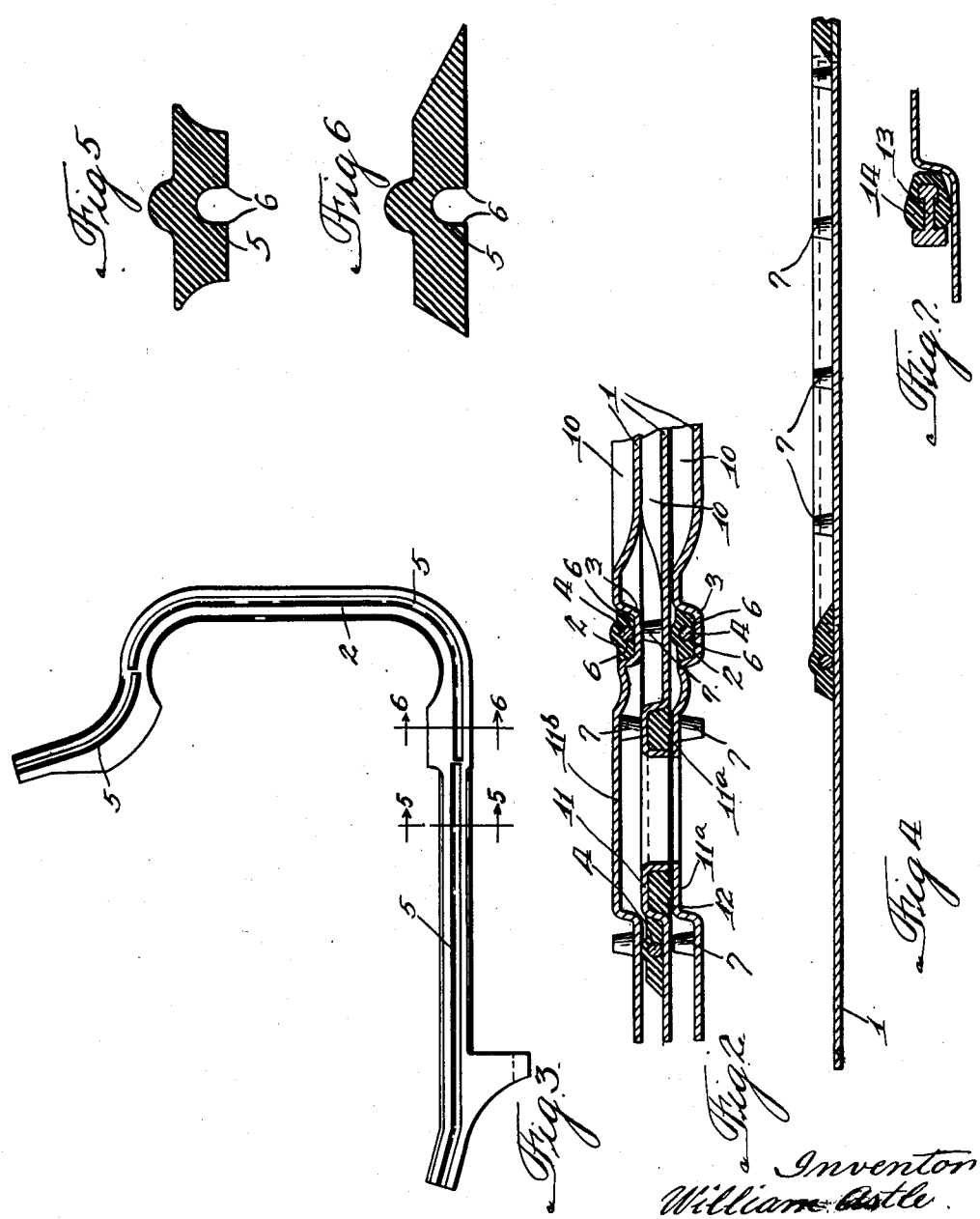
Inventor
William Astle
By Ams, Phinn, Olsen & Mecklenburg
Attys.

Patented June 4, 1940

2,203,123

UNITED STATES PATENT OFFICE 2,203,123

GASKETED PLATE

William Astle, Chicago, Ill.

Application August 16, 1938, Serial No. 225,161

3 Claims. (Cl. 257—245)

My invention relates to gasketed plates. More specifically, it relates to gasketed plates for use in a plate heat exchanger of the juxtaposed plate type.

One of the objects of my invention is to provide a heat exchange plate and a gasket for sealing between the plate and an adjacent surface having improved means for securing the gasket in place on the plate.

A further object is to provide such a construction in which the gasket will be held on the plate by means of a rib secured to the plate and lying in a groove in the gasket.

A further object is to provide such a construction in which the gasket is seated in a channel in the plate.

Further objects and advantages of the invention will be apparent from the description and claims.

In the drawings, in which an embodiment of my invention is shown,

Figure 1 is a plan view of a heat exchange plate showing a gasket in position;

Fig. 2 is a sectional view showing a plurality of plates and gaskets, the intermediate plate being a section substantially on the line 2—2 of Fig. 1; the lower plate being a section substantially on the line 2a—2a of Fig. 1; and the upper plate being a section substantially the same as the lower section except that the upper plate is not ported;

Fig. 3 is a view of the bottom of a corner gasket;

Fig. 4 is a section on the line 4—4 of Fig. 1;

Fig. 5 is a section on the line 5—5 of Fig. 3;

Fig. 6 is a section on the line 6—6 of Fig. 3; and

Fig. 7 is a sectional view showing another form of gasket mounting.

Referring to the drawings in detail, the construction shown comprises a plurality of heat exchange plates 1 which may, if desired, be sheet metal, such as stainless steel, for use in a plate heat exchanger, a plurality of gaskets 2 which may be clamped between the plates 1 for defining a flow space between the plates, and anchorage ribs 4 in general secured to the plate in any suitable manner, as by soldering or by welding. The gasket has a longitudinally-extending groove 5 in its lower surface to receive the anchorage wire. When pressure is applied to the gasket, as will occur when the plates are clamped together in the heat exchanger, pressure on this gasket will force the inner edges 6 of the groove in the gasket underneath the overhanging portions of the wire anchorage member as shown in Fig. 2. This will cause the gasket to become firmly secured to the anchorage member so that when the plates are separated, as in inspection and cleaning, the gaskets will remain in position firmly secured to the plates. In case the gasket is seated so that its side edge engages an adjacent sloping wall of an embossment on the plate, as in Fig. 2, the sloping wall will aid in forcing the edge of the gasket underneath the overhanging portion of the wire anchorage member. The gaskets may be made of any suitable material, such as molded or extruded rubber. In order to prevent buckling of the plates when pressure is applied, suitable metal spacing pins or studs 7 may be welded to certain of the plates in position to engage adjacent plates.

The plate 1, shown in Fig. 1, may be formed from a flat sheet of metal, such as stainless steel having embossments pressed up therefrom, all of the embossments lying on the same side of the general plane of the plate. These embossments comprise the gasket-retaining embossments 8 and 9, the flow control corrugations 10, and the embossments 11, 11a, and 11b. Embossments 11 may be ported and channeled in cross section in order to receive and retain the annular port gasket 12 as shown in Fig. 2. The embossments 11a may be ported and provided with a flange for sealing engagement with the face of a port gasket held in the embossment 11 of an adjacent plate. The embossment 11b may be unported but spaced from the embossment 11 of an adjacent plate to provide for the flow of a fluid between the port in the embossment 11 and the space between the corrugations 10 of adjacent plates.

Figure 1 shows the lower half of a plate, the upper half being symmetrical with the lower half about the axis A—A. The plates may be arranged to control the fluid flow in any suitable manner such as shown in Figs. 5, 10, 10a and 10b of my copending application Serial No. 133,621.

The side edges of the gaskets 2 lie alongside the gasket-retaining embossments 8 and 9 which hold them against lateral movement. These embossments may, in general, be like those shown in my copending application Serial No. 133,621. The ported embossments 11 are shown in cross-section in Fig. 2. Since, as pointed out above, all of these embossments lie on the same side of the general plane of the plate, the assembly of the plates and gaskets is facilitated.

In pressing or forming these embossments, the unembossed portion of the plate is gripped and held by the press against any substantial distortion either vertically or laterally.

The gasket construction shown in Fig. 7 comprises a frame 13 formed of extruded metal having a general I-beam section and a channeled rubber strip 14 fitting over the head and web of the I-beam. The metal frame can be shaped to any desired form to suit the requirements of the particular plate with which it is used.

The frame 13 and strap 14 may be formed as a continuous endless construction engaging the side walls of the embossments 8, 9, and 11 of Fig. 1 bounding the flow space along the surface of the heat exchange plate 1. The frame 13 serves to prevent lateral movement of the gasket away from the side walls of the embossments when the gasket is pressed against an adjacent plate for sealing the flow space.

Further modifications will be apparent to those skilled in the art and it is desired, therefore, that the invention be limited only by the prior art and the scope of the appended claims.

Having thus described my invention, what I claim and desire to secure by Letters Patent is:

1. In a plate heat exchanger of the juxtaposed plate type, a sheet metal heat exchange plate, a gasket for sealing between said plate and an adjacent surface, said plate having a channel therein to receive said gasket, and a rib extending in and along said channel and secured to said plate, said gasket having a groove in the side toward the plate to receive said rib, and said rib having a longitudinally-extending portion overhanging a portion of the gasket.

2. In a plate heat exchanger of the juxtaposed plate type, a sheet metal heat exchange plate, a gasket for sealing between said plate and an adjacent surface, said plate having a channel therein to receive said gasket, and a rib extending in and along said channel and secured to said plate, said gasket having a groove in the side toward the plate to receive said rib, said rib having a longitudinally-extending portion overhanging a portion of the gasket, and said channel having a sloping side which forces a portion of the gasket underneath said overhanging portion.

3. In a plate heat exchanger of the juxtaposed plate type, a sheet metal heat exchange plate, a gasket for sealing between said plate and an adjacent surface, said plate having an elongated embossment thereon, the side of which engages the gasket for holding it in place, and a rib extending alongside said embossment and secured to said plate, said gasket having a groove in the side toward the plate to receive said rib, said rib having a longitudinally-extending portion overhanging a portion of the gasket, and said embossment having a sloping side which forces a portion of the gasket underneath said overhanging portion.

WILLIAM ASTLE.